United States Patent Office 3,736,260
Patented May 29, 1973

3,736,260
ANAEROBIC COMPOSITION IN AEROSOL FORM
Denis J. O'Sullivan, Sutton, Dublin, and Bernard J. Bolger, Foxrock, Dublin, Ireland, assignors to Loctite (Ireland), Limited, Dublin, Ireland
No Drawing. Filed June 8, 1971, Ser. No. 150,937
Claims priority, application Ireland, June 25, 1970, 829/70
Int. Cl. C09k 3/30
U.S. Cl. 252—188.3 R                10 Claims

ABSTRACT OF THE DISCLOSURE

Polymerizable anaerobic compositions are packaged in aerosol containers, pressurized with a propellant containing oxygen as one component. The compositions remain stable and usable for periods of six months or longer.

BACKGROUND OF THE INVENTION

Anaerobic curing compositions are catalyzed polymerizable compositions which are stable in the presence of air (oxygen), but which polymerize to a solid when air is excluded. Anaerobic compositions have found wide industrial use in the bonding of metal or other air-impervious surfaces, such as the "locking" of threaded parts and the bonding of various hub members onto shafts. For example, when an anaerobic composition is applied to a threaded bolt and a mating nut is screwed thereover, air is effectively excluded from the applied composition in the mated threads. Cure of the anaerobic composition commences shortly, thus locking the nut onto the bolt.

Previously, anaerobic compositions have been conventionally stored and sold in low density polyethylene containers, since such containers are permeable to atmospheric oxygen. Thus a continuous supply of atmospheric oxygen is provided directly to the anaerobic composition and to any air space in the container. Heretofore it has been believed that air-impervious containers could not be used since the continuous supply of oxygen through the container wall would be eliminated, and the shelf-life of the composition seriously reduced.

The development of alternative, and hopefully improved, methods and containers for storing, shipping and dispensing of anaerobic compositions would be a most desirable and useful advance in the art.

THE INVENTION

This invention concerns anaerobic compositions packaged in containers not heretofore used for such compositions. It also relates to a new method and package for maintaining anaerobic compositions in a shelf-stable form.

The invention deals with anaerobic compositions packaged in liquid aerosol form, i.e., at super-atmospheric pressures wherein at least a portion of the gas providing such super-atmospheric pressure is oxygen. As a minimum, the oxygen must exert a partial pressure of at least about 0.1 lb. per square inch absolute. The invention also concerns the method of so packaging anaerobic compositions to maintain them in a self-stable condition for a minimum of six months, and more commonly twelve months or longer.

The invention also concerns the method of packaging anaerobic composition comprising placing said anaerobic composition in a container capable of withstanding internal super-atmospheric pressure, pressurizing said container by incorporating therein at least one substance which is a gas at standard temperature and pressure conditions, said container after pressurization having an oxygen partial pressure of at least about 0.1 lb. per square inch absolute.

As used herein, the term "liquid aerosol" is intended to have the conventional meaning of the term as used in the art, and no unusual or limiting meaning is intended herein. Simply, it refers to liquid substances packaged under pressure so as to be dispensed in finely divided sprays or fog-like form.

The term "anaerobic composition" herein refers to the combination of a polymerizable monomer and a free radical polymerization initiator therefor, said mixture hardening by a free radical mechanism which is inhibited by oxygen at room temperature, but which composition will harden within a reasonable time, such as two hours at room temperature, when placed in the absence of oxygen (such as between facing metal plates). Naturally, the anaerobic composition can contain ingredients other than the above named monomer and initiator, as will be discussed hereinafter.

As used herein, "standard conditions of temperature and pressure" refers to typical ambient conditions; unless specifically stated to the contrary, these shall be taken as 75° F. (24° C.) and one atmosphere, respectively.

DESCRIPTION OF THE INVENTION AND ITS PREFERRED EMBODIMENTS

The anaerobic compositions

The most desirable monomers for use in the anaerobic compositions aer polymerizable acrylate esters. When used in the process of this invention, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula

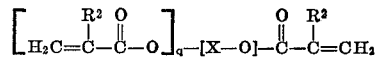

wherein $R^2$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least two carbon atoms and preferably from 2 to about 30 carbon atoms, and having a total bonding capacity of $q$ plus 1. For example, X can be an organic radical of the formula

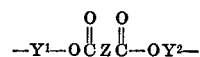

wherein each of $Y^1$ and $Y^2$ is a hydrocarbon group containing at least 2 carbon atoms, and preferably from 2 to about 10 carbon atoms, and Z is a hydrocarbon group containing at least 1 carbon atom, and preferably from 2 to about 10 carbon atoms.

The most highly preferred acrylate esters which can be used in the compositions disclosed herein are polyacrylate esters which have the following general formula:

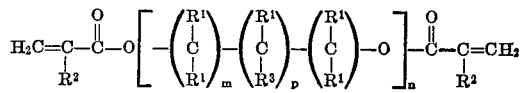

wherein $R^1$ represents a radical selected from the group consisting of hydrogen, lower alkyl of from 1 to about 4 carbon atoms, hydroxy alkyl of from 1 to about 4 carbon atoms, and

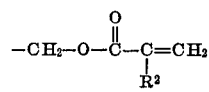

$R^2$ is a radical selected from the group consisting of hydrogen, halogen, and lower alkyl of from 1 to about 4 carbon atoms, $R^3$ is a radical selected from the group consisting of hydrogen, hydroxyl, and

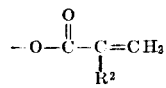

$m$ is an integer equal to at least 1, e.g., from 1 to about 15 or higher, and preferably from 1 to about 8 inclusive; $n$ is an integer equal to at least 1, e.g., 1 to about 40 or more, and preferably between about 2 and about 10; and $p$ is one of the following: 0, 1.

The polymerizable polyacrylate esters utilized in accordance with the invention and corresponding to the above general formula are exemplified by, but not restricted to, the following materials: di-, tri- and tetrethyleneglycol dimethacrylate; dipropyleneglycol dimethacrylate; polyethyleneglycol dimethacryate; polypropyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is preferable to use an ester which has a relatively polar alcoholic moiety, since the polar group tends to provide intermolecular attraction in the cured polymer, thus producing a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl, methacrylate, t-butylaminoethyl methacrylate, cyanoethylacrylate, and chloroethyl methacrylate.

As indicated above, the anaerobic compositions as discussed herein are prepared by mixing a free radical initiator, preferably a peroxy initiator, with one or more of the monomers described above. While certain peroxides (such as dialkyl peroxides) have been disclosed as useful initiators, the hydroperoxides are highly superior and constitute a highly preferred embodiment.

Hydrogen peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexyl peroxide and t-butyl perbenzoate, respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferably is an alkyl, aryl or aralkyl hydrocarbon group containing from about 3 to about 12 carbon atoms. Naturally, $R^4$ can contain any substituent or linkage, hydrocarbon or otherwise, which does not affect the hydroperoxide adversely for the purpose disclosd herein. Typical examples of such organic hydroperoxides are cumene hydroperoxide, tertiary butyl hydroperoxide, methylethylketone hydroperoxide, and hydroperoxides formed by oxygenation of various hydrocarbons, ketones and ethers. The organic hydroperoxide initiators which are used commonly comprises less than about 10 percent by weight of the combination of polymerizable monomer and initiator, since above that level adverse effects on the strength and durability of the cured composition may be experienced.

Preferably the hydroperoxide initiator comprises from about 0.1 percent to about 5 percent by weight of the combination.

Polymerization accelerators generally are incorporated in the composition to obtain rapid cure at the time of intended use. Many free radical polymeriztion accelerators are known, and any may be used which do not adversely affect the anaerobic composition, such as by causing premature cure.

Among the earliest of the polymerization accelerators, uesd in anaerobic composition were amines. The most commonly used are tertiary amines such as tributylamine and triethylamine. Essentially the entire class of tertiary amines can be used in such compositions, and the class may be broadly represented by the formula $$NR^5R^6R^7$$

wherein each of $R^5$, $R^6$ and $R^7$ is a hydrocarbon group containing up to about ten carbon atoms. Naturally, the hydrocarbon groups can contain any substituent or linkage which does not adversely affect the workability of the amine to perform its intended function. Preferably, each of $R^5$, $R^6$ and $R^7$ is an alkyl, aryl or aralkyl group containing up to about 8 carbon atoms. The N,N-dialkyl aryl amines are particularly effective tertiary amines. Certain secondary amines (amines where $R^5$ in the above formula is hydrogen) also can be used as accelerators. The most desirable class of secondary amines has been found to be the class of heterocyclic secondary amines, particularly heterocyclic secondary amines containing up to about 20 carbon atoms. It also is preferred to use those amines wherein the heterocyclic ring is hydrogenated. Typical of such compounds are pyrrolidine, piperazine and 1,2,3,4-tetrahydroquinoline. Certain primary amines (amines where $R^5$ and $R^6$ in the above formula are hydrogen) also can be used. Typical examples are octyl amine and hexyl amine.

Another highly successful class of accelerators is the organic sulfimides, i.e., organic compounds which contain the group

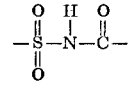

Because of the extreme effectiveness of the sulfimides as accelerators for anaerobic compositions, and because of the apparent strong interaction between the sulfimides and metal contamination, the use of the invention disclosed herein with anaerobic compositions containing organic sulfimides constitutes a highly preferred practice thereof. While the broad class of organic sulfimides can be used successfully, the sulfimides most commonly used can be represented by the formula

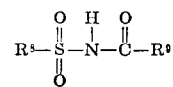

wherein each of $R^8$ and $R^9$ is a hydrocarbon group containing up to about ten carbon atoms, and preferably up to about six carbon atoms. Naturally, $R^8$ and $R^9$ can contain any linkage or substituent which does not adversely affect the sulfimide for its intended use in the anaerobic composition. Further, $R^8$ and $R^9$ can be united to bond the sulfimide group in a heterocyclic ring, or a polynuclear heterocyclic ring system. Of the organic sulfimides, benzoic sulfimide has been found to be the most preferable.

An even more highly preferred composition is that which contains a sulfimide, particularly benzoic sulfimide, in combination with either a heterocyclic secondary amine or a tertiary N,N-dialkyl aryl amine, both of which are described above. For an expanded discussion of this type of system, reference is made to U.S. Pat. 3,218,305 to Krieble, issued Nov. 16, 1965.

Other less active accelerators can be used in the compositions of this invention. Typical examples of such accelerators are succinimide, phthalamide and formamide.

Routine testing easily will determine the optimum amount of accelerator which can be incorporated in a given anaerobic composition. As a general rule, 0.1 to 8 percent of the accelerators, based upon the weight of the total composition, generally can be used. Preferably from about 0.5 to about 5.0 percent is used.

Other ingredients also can be used if desired to impart commercially desirable properties to the composition. Typical examples of such ingredients are thickeners, plasticizers, dyes, adhesive agents and thixotropic agents. Of particular value are free radical inhibitors to provide added stability. Such materials can be used in such combinations and proportions as is desired, provided they do not affect adversely the anaerobic nature of the composition. While exceptions may exist in some cases, these materials generally do not comprise more than about 50 percent by weight of the total composition, and preferably not more than about 20 percent by weight of the composition.

The liquid aerosols

The containers which are used for the aerosol-form anaerobic compositions disclosed herein may be any suitable container capable of withstanding the super-atmospheric internal pressures required of such systems. In view of the fact that best results are obtained with relatively high internal pressures, metallic cannisters are most commonly used and form a preferred embodiment of this invention. While many types of metals are usable in such containers, the most commonly used materials are steel and aluminum. Frequently, these metals are plated with other metals such as tin, or plastics such as polyethylene, in order to provide improved sealing, corrosion resistance, etc.

Dispensing stems and valves for liquid aerosols are readily available from a large number of commercial sources and can be used with the containers and compositions disclosed herein. As with other liquid aerosols, normal precautions should be taken to insure the compatibility of the anaerobic composition and inert propellant with the various parts of the aerosol container.

The requisite absolute internal pressure necessary to dispense the anaerobic composition at the time of intended use may be produced by any substance which is a gas at standard conditions of temperature and pressure, provided the substance does not adversely affect the anaerobic composition for its intended use, such as by causing the anaerobic composition to cure prematurely. Substances which do not adversely affect the anaerobic composition and which may be used for suitably providing the internal superatmospheric pressure in the container are referred to herein as "inert propellants." Examples of suitable gaseous inert propellants are nitrogen, helium, carbon dioxide, neon and argon.

Highly preferred inert propellants are those which are gases at standard conditions of temperature and pressure, but which liquefy under the pressure conditions of the aerosol container. A typical class of compounds wherein a large number of such propellants may be found is the class of chlorinated and/or fluorinated hydrocarbons, generally having from 1 to about 4 carbon atoms, most preferably 1 or 2 carbon atoms. Typical examples of such compounds are dichlorodifluoromethane, trichlorofluoromethane, chloropentafluoroethane and dichlorotetrafluoroethane. An additional advantage of propellants of this type is that they possess relatively high oxygen solubility, and generally are acceptable solvents for the anaerobic compositions. It is believed that as they liquify inside the aerosol container, they incorporate substantial amounts of oxygen into the liquid phase, thus providing improved stability to the anaerobic composition.

Another suitable class of acceptable propellants are the saturated and unsaturated hydrocarbons, generally containing up to about 5 carbon atoms. Typical examples of such materials are ethane, ethylene and propane. From a safety point of view, these propellants may not be acceptable in view of their high flammability.

In addition to the above named inert propellants, sufficient oxygen must be incorporated in the aerosol container to provide the requisite stability of the anaerobic composition. Stable compositions can be prepared with partial pressures of oxygen in the container as low as 0.1 lb. per square inch absolute. The upper limit is basically one of convenience, since oxygen theoretically can be used as the sole inert propellant. This generally is not desirable since it creates localized high concentrations of oxygen during dispensing, which can create a hazard. A practical upper limit for the oxygen partial pressure is about 15 lbs. per square inch or about one-third of the total pressure in the interior of the aerosol container, whichever is higher. A preferred operating range for the oxygen is at a partial pressure between about 1 and about 10 lbs. per square inch, and most preferably between about 2 and about 5 lbs. per square inch.

The total internal pressure in the container is primarily a question of safety and convenience. As a general rule, however, internal pressures for such containers do not exceed about 100 pounds per square inch gauge, and preferably do not exceed about 75 pounds per square inch gauge. Minimum internal pressure again is a question of convenience, but should be at least about 5 pounds per square inch gauge, and preferably 15 pounds per square inch gauge, to permit dispensing.

To dispense the anaerobic composition in liquid aerosol form, the viscosity of the composition should not be excessively high. As a general rule, viscosity below 1000 centipoise should be used. Preferably, the viscosity should be between about 1 and about 200 centipoise and most preferably between about 10 and about 100 centipoise. In these preferred ranges, additional stability benefits are gained due to the fact that oxygen can more easily penetrate into the anaerobic compositions.

EXAMPLES

The following examples are given to demonstrate the methods and compositions of the invention disclosed herein. These examples are not intended to be limitations in any way upon the scope of the invention. Unless specifically stated to the contrary therein, all ratios and percentages in these examples are expressed on a weight basis.

Example I

An anaerobic formulation was prepared by mixing the following ingredients in the approximate weight percentages indicated:

|  | Percent |
|---|---|
| Tetraethyleneglycol dimethacrylate (stabilized) | 97.7 |
| Cumene hydroperoxide | 2.0 |
| Benzoic sulfimide | 0.3 |

108 g. of this formulation was dispensed into each of a number of 8 oz. lacquered aluminum aerosol cans with 72 g. of the commercially available fluorinated hydrocarbon propellant sold under the trade name Arkton 11/12. At this stage the pressure in the cans was 40 lbs. per sq. inch. Oxygen gas was then introduced under pressure until the pressure in the can was between 42 and 45 p.s.i. The resulting liquid aerosols have a shelf life in excess of 1 year at 20° C.

Example II

An anaerobic formulation was prepared by mixing the following ingredients in the approximate weight percentages indicated:

| | |
|---|---|
| Polyethyleneglycol dimethacrylate (approx. avg. molecular weight=330) | 96.3 |
| Cumene hydroperoxide | 3.0 |
| Benzoic sulfimide | 0.4 |
| Dimethyl-p-toluidine | 0.3 | p-Benzoquinone, 100 parts per million by weight.

This composition then was placed in a series of standard epoxy lined aluminum aerosol spray cans. The cans were 5 inches high and had a diameter of 2 inches. Each can was filled approximately one-third full, the remaining space allowed to remain filled with atmospheric pressure air. The cans then were sealed and pressurized with dichlorodifluoromethane. Sufficient dichlorodifluoromethane was added to leave an oxygen partial pressure in the container of approximately 3 p.s.i.

The containers then were stored at 120° F. for eight weeks, the equivalent of approximately six months at room temperature. All cans were found to be usable, the anaerobic composition remaining in the uncured state.

Example III

Example II was repeated, using the following anaerobic composition, all figures being expressed as approximate percent by weight:

| | |
|---|---|
| Polyethyleneglycol dimethacrylate | 94.5 |
| Cumene hydroperoxide | 3.0 |
| Benzoic sulfimide | 1.6 |
| Diethyl-p-toluidine | 0.6 |
| Dimethyl-o-toluidine | 0.3 | p-Benzoquinone, 100 parts per million by weight.

Substantially similar results were obtained in that liquid aerosol compositions were produced. The anaerobic compositions remained stable for the equivalent of six months at room temperature, at which time they could be successfully used in applications suitable for conventional anaerobic compositions, such as the locking of threaded fasteners or the sealing of metal parts.

Example IV

An anaerobic composition, non-flowable in nature, was prepared in a methylene chloride solvent to render it liquid in form. The anaerobic composition was as follows, expressed in approximate weight percent:

| | Percent |
|---|---|
| Polyethyleneglycol dimethacrylate | 53 |
| Cumene hydroperoxide | 1 |
| Tributylamine | 1 |
| Polymethyl methacrylate (thickener) | 32 |
| Cellulose acetate butyrate | 13 |

The liquid composition was prepared by mixing 28% by weight of the anaerobic composition with 72% by weight methylene chloride. The viscosity of the liquid composition was 80 centipoise.

The liquid anaerobic composition was packaged in liquid aerosol form with dichlorodifluoromethane as described in Example II, above. The liquid aerosol product is useful as a spray sealant for coating parts prior to assembly. Accelerated aging indicated the liquid aerosol was stable for in excess of 6 months at room temperature.

We claim:

1. An anaerobic composition in aerosol form comprising a pressurized, sealed container of an anaerobic composition comprising a mixture of a polymerizable acrylate ester and a peroxy polymerization initiator therefor, said container having a super-atmospheric internal gas pressure including an oxygen partial pressure of at least about 0.1 lb. per square inch.

2. The composition of claim 1 wherein the container has an oxygen partial pressure of between about 0.1 lb. per square inch and about 15 lbs. per square inch.

3. The composition of claim 1 wherein the container has an oxygen partial presure from about 2 to about 5 lbs. per square inch.

4. The composition of claim 1 wherein the container contains a propellant for dispensing said anaerobic composition, the propellant being a gas at standard temperature and pressure, but at least a portion thereof being a liquid at standard temperature and the pressure existing in the sealed container.

5. The composition of claim 4 wherein the propellant is selected from the class consisting of chlorinated and fluorinated hydrocarbons containing up to about 4 carbon atoms.

6. The composition of claim 5 wherein the hydrocarbon has 1 or 2 carbon atoms.

7. The composition of claim 1 wherein the container is a metallic container.

8. The composition of claim 1 wherein the peroxy polymerization initiator is a hydroperoxide polymerization initiator, and the acrylate ester is a polyacrylate ester having the formula

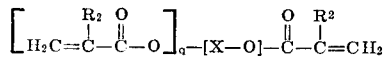

wherein $R^2$ is a radical selected from the group consisting of hydrogen, halogen and alkyl of from 1 to about 4 carbon atoms; $q$ is an integer equal to from 1 to about 4; and X is an organic radical containing from 2 to about 30 carbon atoms, and having a total bonding capacity of $q$ plus 1.

9. The composition of claim 8 wherein the hydroperoxide polymerization initiator comprises less than about 10% by weight of the combination of polyacrylate ester monomers and hydroperoxide polymerization initiator.

10. The composition of claim 9 wherein the anaerobic composition additionally contains an accelerator of free radical polymerization.

References Cited

UNITED STATES PATENTS

| | | | |
|---|---|---|---|
| 2,895,950 | 7/1959 | Krieble | 156—332 |
| 3,616,040 | 10/1971 | Toback | 156—332 |
| 3,341,418 | 9/1967 | Moses et al. | 167—85 |

FOREIGN PATENTS

| | | | |
|---|---|---|---|
| 1,125,528 | 8/1968 | Great Britain | 167—85 |

OTHER REFERENCES

Shepherd, Aerosols: Science & Technology, 1961, pp. 370–1, 515–18, 528–529.

NORMAN G. TORCHIN, Primary Examiner

J. R. MILLER, Assistant Examiner

U.S. Cl. X.R.

53—266; 156—332; 252—186, 305